(12) United States Patent
Baldridge

(10) Patent No.: US 11,440,575 B2
(45) Date of Patent: Sep. 13, 2022

(54) MOTORIZED CART ASSEMBLY

(71) Applicant: Michelle Baldridge, Pittsburgh, PA (US)

(72) Inventor: Michelle Baldridge, Pittsburgh, PA (US)

( * ) Notice: Subject to any disclaimer, the term of this patent is extended or adjusted under 35 U.S.C. 154(b) by 467 days.

(21) Appl. No.: 16/683,810

(22) Filed: Nov. 14, 2019

(65) Prior Publication Data

US 2021/0146984 A1    May 20, 2021

(51) Int. Cl.
*B62B 3/02*    (2006.01)
*B62B 5/00*    (2006.01)
*B66F 11/04*   (2006.01)
*E21B 10/44*   (2006.01)

(52) U.S. Cl.
CPC ............ *B62B 5/0046* (2013.01); *B62B 3/02* (2013.01); *B62B 5/0053* (2013.01); *B62B 5/0069* (2013.01); *B66F 11/042* (2013.01); *B62B 2203/10* (2013.01); *B62B 2206/06* (2013.01); *E21B 10/44* (2013.01)

(58) Field of Classification Search
CPC ... B62B 5/0046; B62B 5/0053; B62B 5/0069; B62B 3/02; B62B 2203/10; B62B 2206/042; B62B 2206/06; E21B 10/44; B66F 11/042

See application file for complete search history.

(56) References Cited

U.S. PATENT DOCUMENTS

| | | | |
|---|---|---|---|
| 3,021,625 A | 2/1962 | Stasse | |
| 4,979,578 A * | 12/1990 | Landry | E21B 19/087 175/203 |
| 6,056,065 A * | 5/2000 | Campbell | E21B 10/44 175/170 |
| 6,129,166 A | 10/2000 | Sueshige | |
| D487,325 S | 3/2004 | Nelsen | |
| 7,210,545 B1 | 5/2007 | Waid | |
| 8,424,883 B1 * | 4/2013 | Ramos | B62B 3/02 280/47.35 |
| 8,746,377 B1 | 6/2014 | Dunbar | |
| 9,844,868 B1 * | 12/2017 | Abbey | B25D 17/24 |
| 10,487,583 B2 * | 11/2019 | Jurjevic | E21B 11/005 |
| 2005/0161916 A1 * | 7/2005 | Taylor | B62B 1/125 280/655.1 |
| 2014/0374680 A1 * | 12/2014 | Tsang | B62B 3/0612 254/7 C |
| 2016/0375919 A1 * | 12/2016 | Wright | A01K 1/0107 119/165 |
| 2017/0203778 A1 | 7/2017 | Jackson | |
| 2018/0290332 A1 * | 10/2018 | Ross | E04C 1/00 |

FOREIGN PATENT DOCUMENTS

CN    108150099 A  *  6/2018

* cited by examiner

*Primary Examiner* — John D Walters

(57) ABSTRACT

A motorized cart assembly for use in gardening and other outdoor chores includes a first motor that is operationally coupled to a rear axle of a rolling chassis. The first motor is configured to selectively rotate the rear axle to locomote the rolling chassis. A lift module that is coupled to the rolling chassis is configured to selectively raise and lower an item that is positioned upon an upper plate of the lift module. A handle, which is coupled to at least one of the rolling chassis and the upper plate, is configured to be grasped in at least one hand of a user to steer the rolling chassis.

15 Claims, 5 Drawing Sheets

MOTORIZED CART ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cart assemblies and more particularly pertains to a new cart assembly for use in gardening and other outdoor chores.

(2) Description of Related Art Including Information Disclosed Under 37 CFR 1.97 and 1.98

The prior art relates to cart assemblies.

BRIEF SUMMARY OF THE INVENTION

An embodiment of the disclosure meets the needs presented above by generally comprising a first motor that is operationally coupled to a rear axle of a rolling chassis. The first motor is configured to selectively rotate the rear axle to locomote the rolling chassis. A lift module that is coupled to the rolling chassis is configured to selectively raise and lower an item that is positioned upon an upper plate of the lift module. A handle, which is coupled to at least one of the rolling chassis and the upper plate, is configured to be grasped in at least one hand of a user to steer the rolling chassis.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
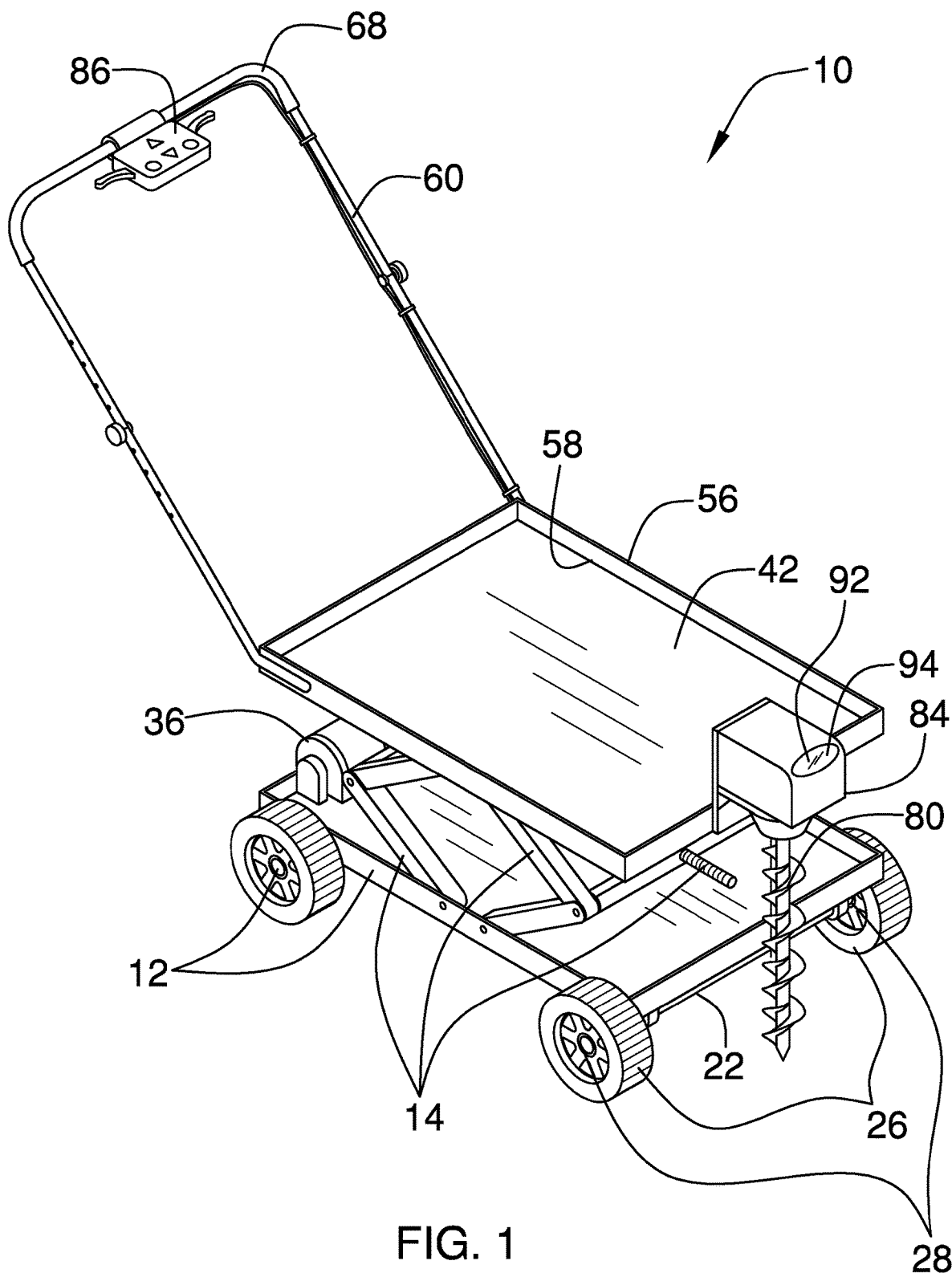
FIG. 1 is an isometric perspective view of a motorized cart assembly according to an embodiment of the disclosure.

With reference now to the drawings, and in particular to FIGS. 1 through 5 thereof, a new cart assembly embodying the principles and concepts of an embodiment of the disclosure and generally designated by the reference numeral 10 will be described.

As best illustrated in FIGS. 1 through 5, the motorized cart assembly 10 generally comprises a rolling chassis 12 and a lift module 14 that is coupled to the rolling chassis 12. The rolling chassis 12 comprises a lower plate 16 that is substantially rectangularly shaped. A lip 18 that is coupled to and extends perpendicularly from a circumference 20 of the lower plate 16 is positioned to rigidify the lower plate 16.

A front axle 22 is rotationally coupled to the lower plate 16 proximate to a front edge 24 of the lower plate 16. Each of a pair of front wheels 26 is coupled to a respective opposing endpoint 28 of the front axle 22. A rear axle 30 is rotationally coupled to the lower plate 16 proximate to a rear edge 32 of the lower plate 16. Each of a pair of rear wheels 34 is coupled to a respective opposing end 96 of the rear axle 30.

A first motor 36 that is operationally coupled to the rear axle 30 is configured to selectively rotate the rear axle 30 to locomote the rolling chassis 12. A belt 38 that is operationally coupled to and extends between a shaft 40 of the first motor 36 and the rear axle 30 is positioned to transfer rotation of the shaft 40 to the rear axle 30 to locomote the rolling chassis 12.

Figure 3:
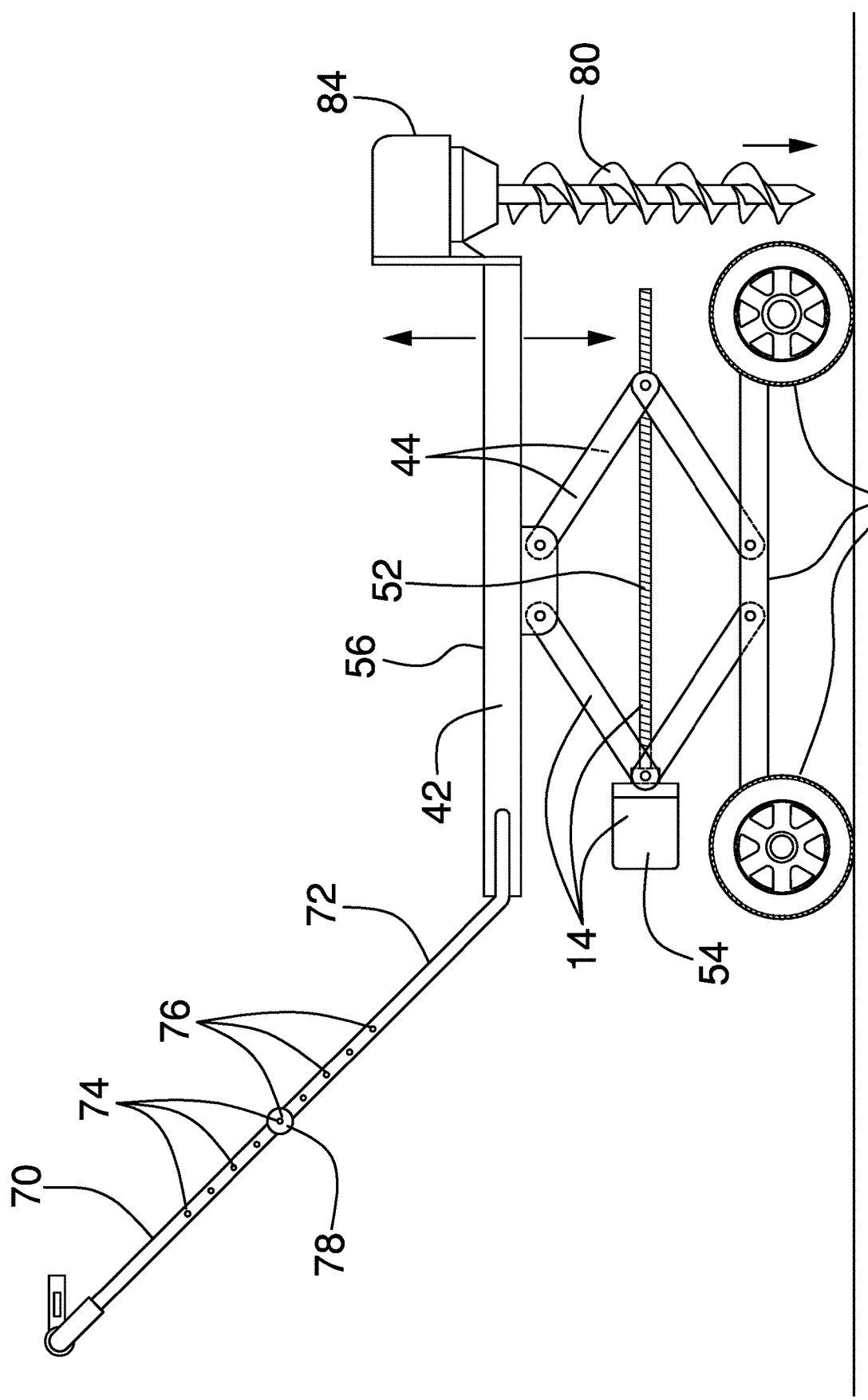
FIG. 3 is a side view of an embodiment of the disclosure.

The lift module 14 is configured to selectively raise and lower an item that is positioned upon an upper plate 42 of the lift module 14. The upper plate 42 is substantially rectangularly shaped. The lift module 14 may comprise a pair of scissor jacks 44, or other lifting means, such as, but not limited to, hydraulic cylinders and the like. Each scissor jack 44 is pivotally coupled to and extends between the rolling chassis 12 and the upper plate 42, as shown in FIG. 3. The scissor jack 44 is positioned proximate to a respective opposing edge 46 of the upper plate 42.

Figure 4:
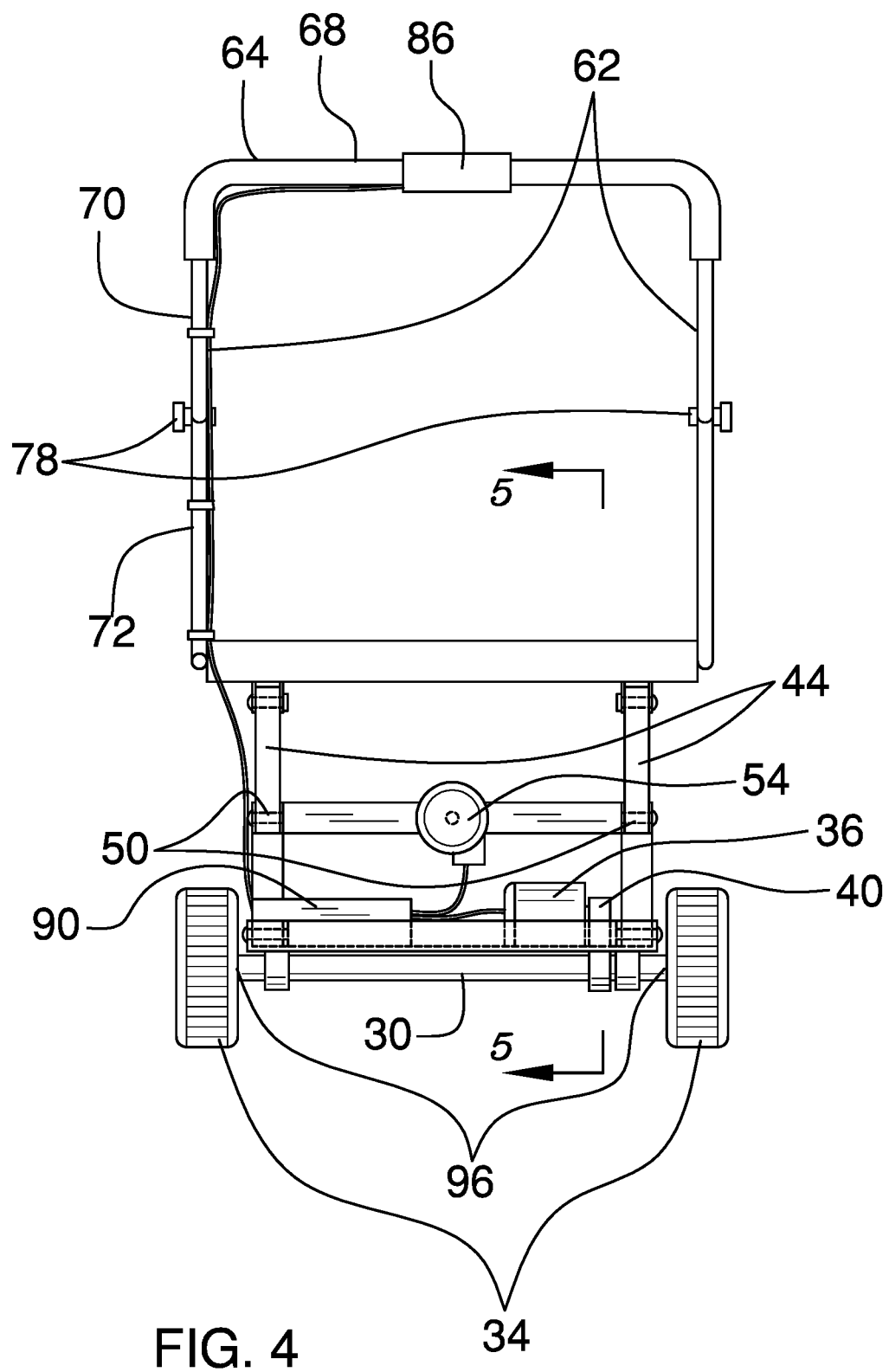
FIG. 4 is a rear view of an embodiment of the disclosure.
Figure 5:
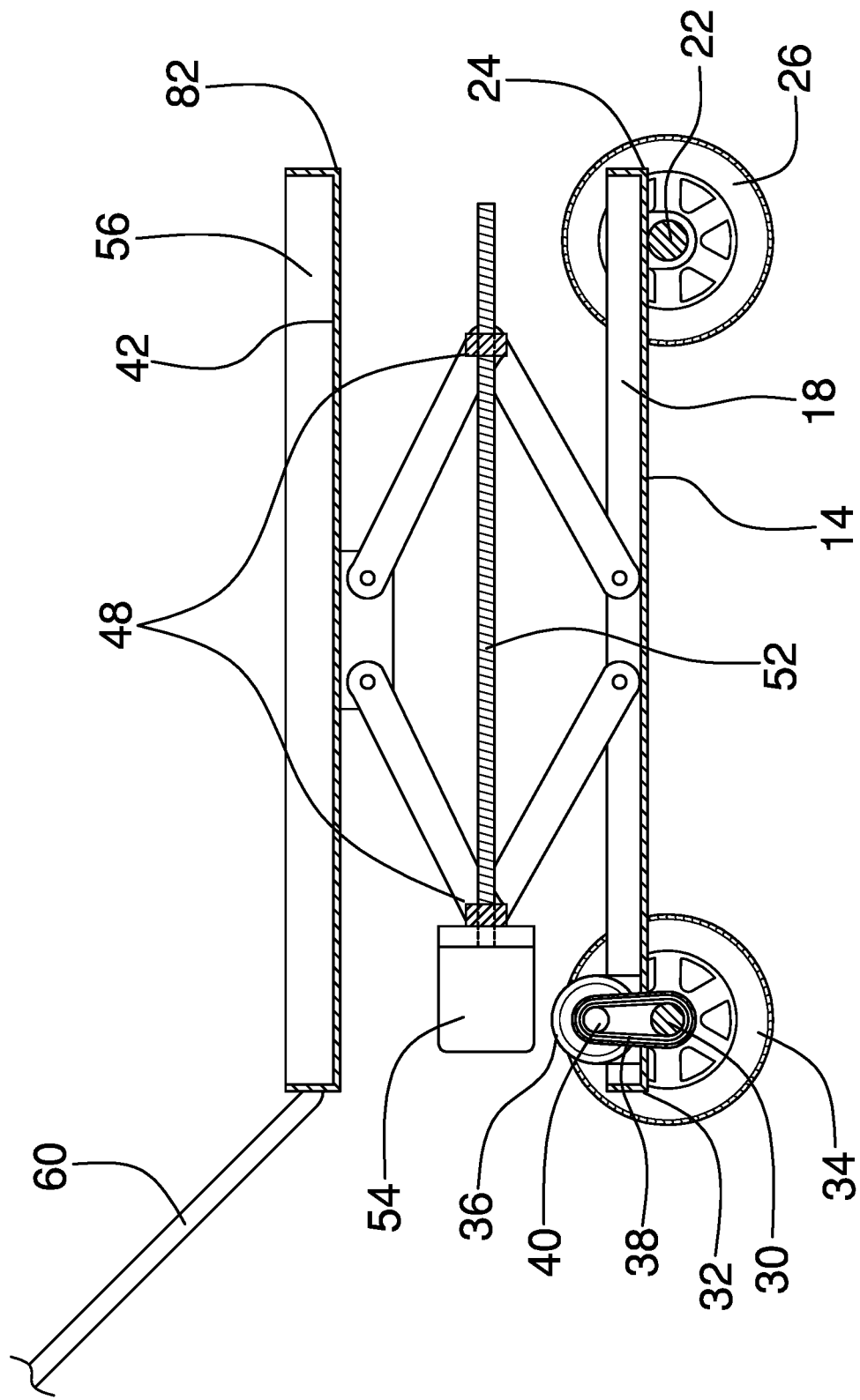
FIG. 5 is a cross-sectional view of an embodiment of the disclosure.

Each of a pair of pin rods 48 is rotationally coupled to and extends between associated pivot points 50 of the pair of scissor jacks 44, as shown in FIG. 3. A threaded rod 52 is threadedly coupled to and extends between the pair of pin rods 48, as shown in FIG. 4. A second motor 54 that is operationally coupled to the threaded rod 52 is positioned to selectively rotate the threaded rod 52 to extend and retract of the pair of scissor jacks 44.

A rim 56 that is coupled to and extends perpendicularly from a perimeter 58 of the upper plate 42 is positioned to rigidify the upper plate 42. The rim 56 also is configured to retain the item upon the second plate.

A handle 60, which is coupled to at least one of the rolling chassis 12 and the upper plate 42, is configured to be grasped in at least one hand of a user to steer the rolling chassis 12. The present invention is anticipated to be of utility in completion of a variety of tasks, both indoors and outdoors. For example, the assembly 10 may be used to transport a load of gardening items from a vehicle to a garden, using the first motor 36 to power movement of the rolling chassis 12, rather than brute force as required by an unpowered cart. The assembly 10 also might be used to transport a heavy pot to a desired location. The lift module 14 then could be actuated to raise the heavy pot to a level from which it can be transferred horizontally to a stand.

The handle 60 may comprise a pair of first bars 62 and a second bar 64. Each first bar 62 is coupled to and extends transversely from a respective rearward corner 66 of the upper plate 42. The second bar 64 is coupled to and extends between the first bars 62 distal from the upper plate 42. A grip 68 that is coupled to the second bar 64 is configured to enhance a grasp of the hand of the user upon the handle 60. The handle 60 also may be of other configurations, such as, but not limited to, a single first bar 62 extending from the upper plate 42 with the second bar 64 extending bidirectionally from the first bar 62 distal from the upper plate 42.

Each first bar 62 may comprise an upper segment 70 that is selectively couplable to a lower segment 72 so that the first bar 62 is selectively extensible. A set of first orifices 74 and a set of second orifices 76 are positioned in the upper segment 70 and the lower segment 72, respectively, so that the second orifices 76 are selectively alignable with the first orifices 74. Each of a pair of thumbscrews 78 is selectively threadedly insertable into a respective pair of second orifices 76 and a respective pair of first orifices 74 to couple a respective upper segment 70 to an associated lower segment 72.

Figure 2:
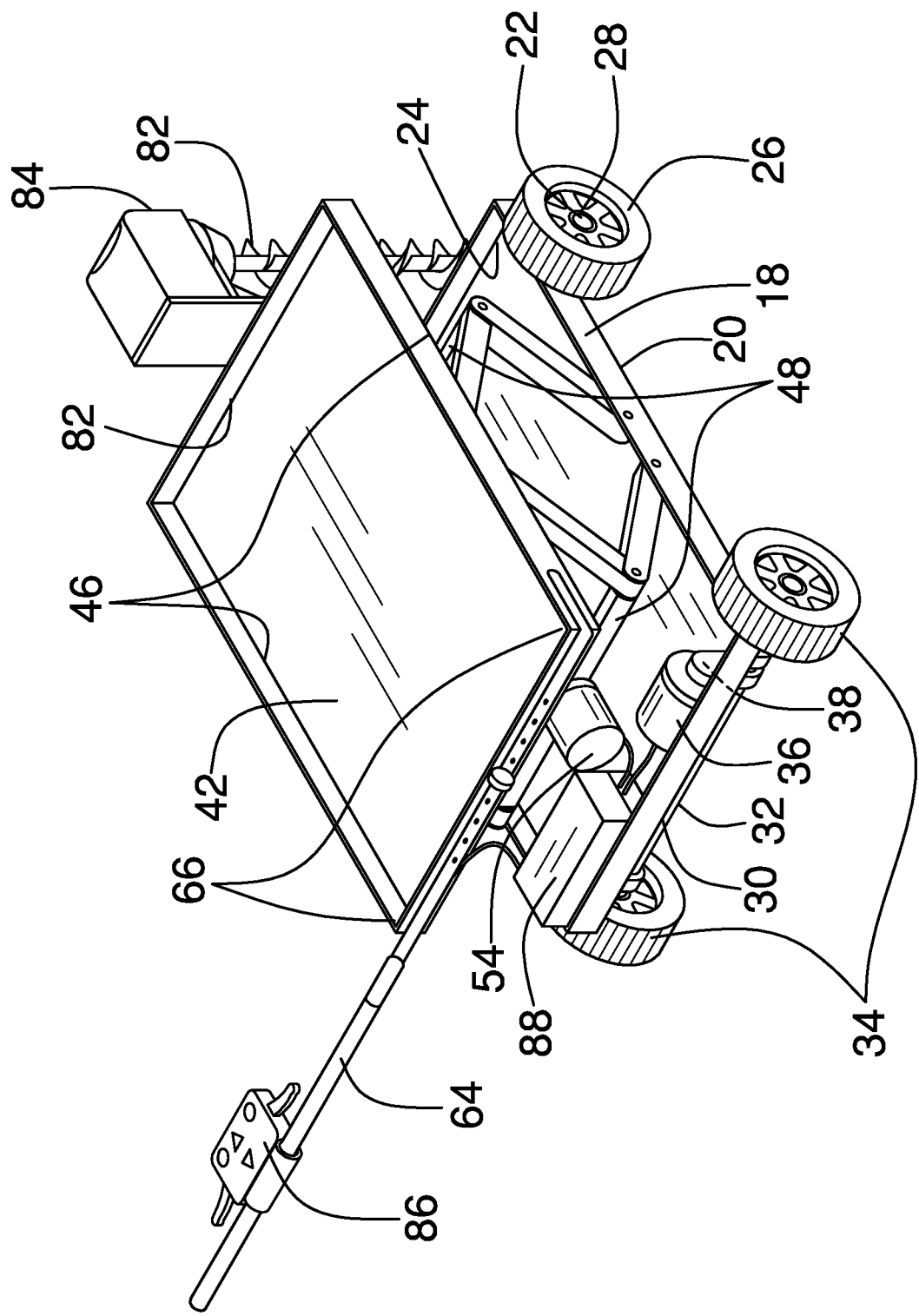
FIG. 2 is an isometric perspective view of an embodiment of the disclosure.

The assembly 10 also may comprise an auger 80 that is coupled to a forward edge 82 of the upper plate 42, as shown in FIGS. 1-3, so that the auger 80 is perpendicular to the upper plate 42. A third motor 84 that is operationally coupled to the auger 80 is positioned to selectively rotate the auger 80 to bore a hole in a substrate upon which the rolling chassis 12 is positioned as the lift module 14 lowers the upper plate 42 toward the rolling chassis 12.

A controller 86 that is coupled to the handle 60 is operationally coupled to the first motor 36, the second motor 54, and the third motor 84. The controller 86 is configured to enable the user to selectively actuate the first motor 36, the second motor 54, and the third motor 84.

A power module 88 is coupled to at least one of the rolling chassis 12 and the upper plate 42. The power module 88 is operationally coupled to the controller 86, the first motor 36, the second motor 54, and the third motor 84. The controller 86 is positioned to selectively couple the first motor 36 to the power module 88 to locomote the rolling chassis 12. The controller 86 also is positioned to selectively couple the second motor 54 to the power module 88 to selectively lift and lower the item that is positioned upon the upper plate 42. The controller 86 also is positioned to selectively couple both the third motor 84 and the second motor 54 to the power module 88 to bore the hole in the substrate.

The power module 88 may comprise a battery 90, as shown in FIG. 4, with the first motor 36, the second motor 54, and the third motor 84 being electric type. The battery 90 may be rechargeable. The present invention also anticipates the first motor 36, the second motor 54, and the third motor 84 being liquid fuel engine type, such as, but not limited to, gasoline powered engines, diesel powered engines, and propane powered engines, and the like.

The assembly 10 also may comprise a bulb 92 that is coupled to at least one of the auger 80, as shown in FIG. 1, and the handle 60 (not shown). The bulb 92 is operationally coupled to the controller 86 and the power module 88 so that the controller 86 is positioned to selectively couple the bulb 92 to the power module 88. The bulb 92 is configured to illuminate an area that is proximate to the rolling chassis 12, enabling the user to operate the assembly 10 in conditions of low ambient light. The bulb 92 may comprise a light emitting diode 94.

In use, the controller 86 selectively utilized to couple the first motor 36 to the power module 88 to locomote the rolling chassis 12, to selectively couple the second motor 54 to the power module 88 to selectively lift and lower the item that is positioned upon the upper plate 42, and to selectively couple both the third motor 84 and the second motor 54 to the power module 88 to bore the hole in the substrate.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A motorized cart assembly comprising:
   a rolling chassis;
   a first motor operationally coupled to a rear axle of the rolling chassis wherein the first motor is configured for selectively rotating the rear axle for locomoting the rolling chassis;
   a lift module coupled to the rolling chassis wherein the lift module is configured for selectively raising and lowering an item positioned upon an upper plate of the lift module, the upper plate being substantially rectangularly shaped;
   a handle coupled to at least one of the rolling chassis and the upper plate wherein the handle is configured for grasping in at least one hand of a user for steering the rolling chassis
   the rolling chassis comprising:
      a lower plate, the lower plate being substantially rectangularly shaped;

a front axle rotationally coupled to the lower plate proximate to a front edge of the lower plate;
a pair of front wheels, each front wheel being coupled to a respective opposing endpoint of the front axle;
the rear axle rotationally coupled to the lower plate proximate to a rear edge of the lower plate; and
a pair of rear wheels, each rear wheel being coupled to a respective opposing end of the rear axle;
the lift module comprising:
a pair of scissor jacks, each scissor jack being pivotally coupled to and extending between the rolling chassis and the upper plate, the scissor jack being positioned proximate to a respective opposing edge of the upper plate;
a pair of pin rods, each pin rod being rotationally coupled to and extending between associated pivot points of the pair of scissor jacks;
a threaded rod threadedly coupled to and extending between the pair of pin rods; and
a second motor operationally coupled to the threaded rod such that the second motor is positioned for selectively rotating the threaded rod for extending and retracting of the pair of scissor jacks;
an auger coupled to a forward edge of the upper plate such that the auger is perpendicular to the upper plate; and
a third motor operationally coupled to the auger such that the third motor is positioned for selectively rotating the auger for boring a hole in a substrate upon which the rolling chassis is positioned as the lift module lowers the upper plate toward the rolling chassis.

2. The assembly of claim 1, further including a lip coupled to and extending perpendicularly from a circumference of the lower plate such that the lip is positioned for rigidifying the lower plate.

3. The assembly of claim 1, further including a belt operationally coupled to and extending between a shaft of the first motor and the rear axle such that the belt is positioned for transferring rotation of the shaft to the rear axle for locomoting the rolling chassis.

4. The assembly of claim 1, further including the handle comprising a pair of first bars and a second bar, each first bar being coupled to and extending transversely from a respective rearward corner of the upper plate, the second bar being coupled to and extending between the first bars distal from the upper plate.

5. The assembly of claim 4, further including each first bar comprising an upper segment selectively couplable to a lower segment such that the first bar is selectively extensible.

6. The assembly of claim 5, further comprising:
a set of first orifices positioned in the upper segment;
a set of second orifices positioned in the lower segment such that the second orifices are selectively alignable with the first orifices; and
a pair of thumbscrews, each thumbscrew being selectively threadedly insertable into a respective pair of second orifices and a respective pair of first orifices for coupling a respective upper segment to an associated lower segment.

7. The assembly of claim 4, further including a grip coupled to the second bar wherein the grip is configured for enhancing a grasp of the hand of the user upon the handle.

8. The assembly of claim 1, further including a controller coupled to the handle, the controller being operationally coupled to the first motor, the second motor, and the third motor wherein the controller is configured for enabling the user for selectively actuating the first motor, the second motor, and the third motor.

9. The assembly of claim 8, further including a power module coupled to at least one of the rolling chassis and the upper plate, the power module being operationally coupled to the controller, the first motor, the second motor, and the third motor such that the controller is positioned for selectively coupling the first motor to the power module for locomoting the rolling chassis, the second motor to the power module for selectively lifting and lowering the item positioned upon the upper plate, and both the third motor and the second motor to the power module for boring the hole in the substrate.

10. The assembly of claim 9, further including the power module comprising a battery.

11. The assembly of claim 9, further including the battery being rechargeable.

12. The assembly of claim 9, further including a bulb coupled to at least one of the auger and the handle, the bulb being operationally coupled to the controller and the power module such that the controller is positioned for selectively coupling the bulb to the power module wherein the bulb is configured for illuminating an area proximate to the rolling chassis.

13. The assembly of claim 12, further including the bulb comprising a light emitting diode.

14. A motorized cart assembly comprising:
a rolling chassis;
a first motor operationally coupled to a rear axle of the rolling chassis wherein the first motor is configured for selectively rotating the rear axle for locomoting the rolling chassis;
a lift module coupled to the rolling chassis wherein the lift module is configured for selectively raising and lowering an item positioned upon an upper plate of the lift module, the upper plate being substantially rectangularly shaped;
a handle coupled to at least one of the rolling chassis and the upper plate wherein the handle is configured for grasping in at least one hand of a user for steering the rolling chassis;
the rolling chassis comprising:
a lower plate, the lower plate being substantially rectangularly shaped;
a front axle rotationally coupled to the lower plate proximate to a front edge of the lower plate;
a pair of front wheels, each front wheel being coupled to a respective opposing endpoint of the front axle;
the rear axle rotationally coupled to the lower plate proximate to a rear edge of the lower plate; and
a pair of rear wheels, each rear wheel being coupled to a respective opposing end of the rear axle;
the lift module comprising:
a pair of scissor jacks, each scissor jack being pivotally coupled to and extending between the rolling chassis and the upper plate, the scissor jack being positioned proximate to a respective opposing edge of the upper plate;
a pair of pin rods, each pin rod being rotationally coupled to and extending between associated pivot points of the pair of scissor jacks;
a threaded rod threadedly coupled to and extending between the pair of pin rods; and
a second motor operationally coupled to the threaded rod such that the second motor is positioned for selectively rotating the threaded rod for extending and retracting of the pair of scissor jacks; and a rim coupled to and extending perpendicularly from a perimeter of the upper plate such that the rim is positioned for rigidifying the upper plate and wherein the rim is configured for retaining the item upon the second plate.

15. A motorized cart assembly comprising:

a rolling chassis, the rolling chassis comprising:
- a lower plate, the lower plate being substantially rectangularly shaped,
- a lip coupled to and extending perpendicularly from a circumference of the lower plate such that the lip is positioned for rigidifying the lower plate,
- a front axle rotationally coupled to the lower plate proximate to a front edge of the lower plate,
- a pair of front wheels, each front wheel being coupled to a respective opposing endpoint of the front axle,
- a rear axle rotationally coupled to the lower plate proximate to a rear edge of the lower plate, and
- a pair of rear wheels, each rear wheel being coupled to a respective opposing end of the rear axle;

a first motor operationally coupled to the rear axle of the rolling chassis wherein the first motor is configured for selectively rotating the rear axle for locomoting the rolling chassis;

a belt operationally coupled to and extending between a shaft of the first motor and the rear axle such that the belt is positioned for transferring rotation of the shaft to the rear axle for locomoting the rolling chassis;

a lift module coupled to the rolling chassis wherein the lift module is configured for selectively raising and lowering an item positioned upon an upper plate of the lift module, the upper plate being substantially rectangularly shaped, the lift module comprising:
- a pair of scissor jacks, each scissor jack being pivotally coupled to and extending between the rolling chassis and the upper plate, the scissor jack being positioned proximate to a respective opposing edge of the upper plate,
- a pair of pin rods, each pin rod being rotationally coupled to and extending between associated pivot points of the pair of scissor jacks,
- a threaded rod threadedly coupled to and extending between the pair of pin rods, and
- a second motor operationally coupled to the threaded rod such that the second motor is positioned for selectively rotating the threaded rod for extending and retracting of the pair of scissor jacks;

a rim coupled to and extending perpendicularly from a perimeter of the upper plate such that the rim is positioned for rigidifying the upper plate and wherein the rim is configured for retaining the item upon the second plate;

a handle coupled to at least one of the rolling chassis and the upper plate wherein the handle is configured for grasping in at least one hand of a user for steering the rolling chassis, the handle comprising a pair of first bars and a second bar, each first bar being coupled to and extending transversely from a respective rearward corner of the upper plate, the second bar being coupled to and extending between the first bars distal from the upper plate, each first bar comprising an upper segment selectively couplable to a lower segment such that the first bar is selectively extensible;

a set of first orifices positioned in the upper segment;

a set of second orifices positioned in the lower segment such that the second orifices are selectively alignable with the first orifices;

a pair of thumbscrews, each thumbscrew being selectively threadedly insertable into a respective pair of second orifices and a respective pair of first orifices for coupling a respective upper segment to an associated lower segment;

a grip coupled to the second bar wherein the grip is configured for enhancing a grasp of the hand of the user upon the handle;

an auger coupled to a forward edge of the upper plate such that the auger is perpendicular to the upper plate;

a third motor operationally coupled to the auger such that the third motor is positioned for selectively rotating the auger for boring a hole in a substrate upon which the rolling chassis is positioned as the lift module lowers the upper plate toward the rolling chassis;

a controller coupled to the handle, the controller being operationally coupled to the first motor, the second motor, and the third motor wherein the controller is configured for enabling the user for selectively actuating the first motor, the second motor, and the third motor;

a power module coupled to at least one of the rolling chassis and the upper plate, the power module being operationally coupled to the controller, the first motor, the second motor, and the third motor such that the controller is positioned for selectively coupling the first motor to the power module for locomoting the rolling chassis, the second motor to the power module for selectively lifting and lowering the item positioned upon the upper plate, and both the third motor and the second motor to the power module for boring the hole in the substrate, the power module comprising a battery, the battery being rechargeable; and a bulb coupled to at least one of the auger and the handle, the bulb being operationally coupled to the controller and the power module such that the controller is positioned for selectively coupling the bulb to the power module wherein the bulb is configured for illuminating an area proximate to the rolling chassis, the bulb comprising a light emitting diode.

* * * * *